(12) United States Patent
Kim et al.

(10) Patent No.: US 11,176,402 B2
(45) Date of Patent: Nov. 16, 2021

(54) METHOD AND DEVICE FOR IDENTIFYING OBJECT

(71) Applicant: Samsung Electronics Co., Ltd., Gyeonggi-do (KR)

(72) Inventors: Deok-ho Kim, Seoul (KR); Won-woo Lee, Seoul (KR); Jae-woong Lee, Gyeonggi-do (KR); Bong-hoon Park, Gyeonggi-do (KR); Gun-Ill Lee, Gyeonggi-do (KR); Ji-won Jeong, Gyeonggi-do (KR); Teresa Ka Ki Ng, Seoul (KR)

(73) Assignee: Samsung Electronics Co., Ltd

( * ) Notice: Subject to any disclaimer, the term of this patent is extended or adjusted under 35 U.S.C. 154(b) by 75 days.

(21) Appl. No.: 16/613,627

(22) PCT Filed: May 8, 2018

(86) PCT No.: PCT/KR2018/005257
§ 371 (c)(1),
(2) Date: Nov. 14, 2019

(87) PCT Pub. No.: WO2018/212494
PCT Pub. Date: Nov. 22, 2018

(65) Prior Publication Data
US 2020/0193207 A1    Jun. 18, 2020

(30) Foreign Application Priority Data
May 17, 2017  (KR) .......................... 10-2017-0060961

(51) Int. Cl.
*G06K 9/32*   (2006.01)
*G06K 9/62*   (2006.01)
*G06K 9/20*   (2006.01)

(52) U.S. Cl.
CPC ......... *G06K 9/3241* (2013.01); *G06K 9/6221* (2013.01); *G06K 9/6247* (2013.01)

(58) Field of Classification Search
None
See application file for complete search history.

(56) References Cited

U.S. PATENT DOCUMENTS

| | | | |
|---|---|---|---|
| 10,133,938 B2 | 11/2018 | Kim et al. | |
| 2010/0316287 A1* | 12/2010 | Duong | G06K 9/342 |
| | | | 382/164 |

(Continued)

FOREIGN PATENT DOCUMENTS

| | | |
|---|---|---|
| KR | 1020150132699 | 11/2015 |
| KR | 1020160061856 | 6/2016 |

(Continued)

OTHER PUBLICATIONS

Karen Simonyan et al., "Very Deep Convolutional Networks for Large-Scale Image Recognition", Conference Paper at ICLR 2015, Apr. 10, 2015, 14 pages.

(Continued)

*Primary Examiner* — Mohammed Rachedine
(74) *Attorney, Agent, or Firm* — The Farrell Law Firm, P.C.

(57) ABSTRACT

Provided are an artificial intelligence (AI) system for simulating functions such as recognition, determination, and so forth of the human brain by using a mechanical learning algorithm like deep learning, or the like, and an application thereof. The disclosure relates to a method, performed by a device, of identifying an object, and the method includes obtaining an image including an object, extracting attribute information of the object from the image by using a plurality of layers included in a network for determining a category of the object, obtaining feature information representing the object by combining attribute information extracted from at (Continued)

least some layers among the plurality of layers by using at least one feature extraction layer, and identifying the object based on a result of comparing the obtained feature information with feature information of each of a plurality of previously stored object images, wherein a parameter of each of the at least one feature extraction layer is configured according to a training result based on a database including a plurality of images.

20 Claims, 8 Drawing Sheets

(56) References Cited

U.S. PATENT DOCUMENTS

| | | | | |
|---|---|---|---|---|
| 2013/0132236 | A1* | 5/2013 | Gokturk | G06Q 30/0643 705/26.61 |
| 2016/0086047 | A1* | 3/2016 | Suh | G06K 9/6247 382/159 |
| 2016/0086078 | A1 | 3/2016 | Ji et al. | |
| 2016/0189010 | A1 | 6/2016 | Tang et al. | |
| 2018/0181799 | A1 | 6/2018 | Yoo et al. | |
| 2019/0279052 | A1 | 9/2019 | Han et al. | |
| 2020/0193207 | A1* | 6/2020 | Kim | G06K 9/62 |

FOREIGN PATENT DOCUMENTS

| | | | | |
|---|---|---|---|---|
| KR | 1020160072768 | | 6/2016 | |
| KR | 1020170034226 | | 3/2017 | |
| WO | WO-2013115203 A1 * | 8/2013 | | G06K 9/3241 |
| WO | WO-2017008435 A1 * | 1/2017 | | G06K 9/3241 |

OTHER PUBLICATIONS

Hengliang Luo, "Siamese Network: Architecture and Applications in Computer Vision", Dec. 30, 2014, 34 pages.
Kevin Lin et al., "Deep Learning of Binary Hash Codes for Fast Image Retrieval", 2015, 9 pages.
Zhangjie Cao et al., "HashNet: Deep Learning to Hash by Continuation", Computer Vision Foundation, 2017, 10 pages.
Chen Huang et al., "Local Similarity-Aware Deep Feature Embedding", 30th Conference on Neural Information Processing Systems (NIPS 2016), Oct. 27, 2016, 9 pages.
Eva Mohedano, "Bags of Local Convolutional Features for Scalable Instance Search", ACM International Conference on Multimedia Retrieval (ICMR), Apr. 15, 2016, 6 pages.
Ali S. Razavian et al., "Visual Instance Retrieval with Deep Convolutional Networks", ITE Trans. on MTA, vol. 4, No. 3, 2016, 8 pages.
Junshi Huang et al., "Cross-Domain Image Retrieval with a Dual Attribute-aware Ranking Network", Computer Vision Foundation, 2015, 9 pages.
International Search Report dated Aug. 14, 2018 issued in counterpart application No. PCT/KR2018/005257, 16 pages.
Ji Wan et al., "Deep Learning for Content-Based Image Retrieval: A Comprehensive Study", XP058058712, Nov. 3, 2014, 10 pages.
Artem Babenko et al., "Aggregating Deep Convolutional Features for Image Retrieval", XP055663797, Oct. 26, 2015, 9 pages.
Hao Liu et al., "End-to-End Comparative Attention Networks for Person Re-Identification", IEEE Transactions on Image Processing, XP055541087, May 3, 2017, 15 pages.
European Search Report dated Apr. 7, 2020 issued in counterpart application No. 18801300.7-1207, 8 pages.

* cited by examiner

METHOD AND DEVICE FOR IDENTIFYING OBJECT

PRIORITY

This application is a National Phase Entry of PCT International Application No. PCT/KR2018/005257 which was filed on May 8, 2018, and claims priority to Korean Patent Application No. 10-2017-0060961, which was filed on May 17, 2017, the content of each of which is incorporated herein by reference.

TECHNICAL FIELD

The disclosure relates to a method and device for identifying an object.

BACKGROUND ART

An artificial intelligence (AI) system is a computer system that implements human-level intelligence, and allows a machine to self-train, make decisions, and become smarter, unlike an existing rule-based smart system. The more an AI system is used, the greater its recognition rate and the more accurately a user's taste may be understood. Thus, existing rule-based smart systems have been gradually replaced with deep-learning-based AI systems.

AI technology includes machine learning (e.g., deep learning) and element technologies using machine learning.

Machine learning refers to an algorithm technology in which a machine classifies and learns characteristics of input data by itself. Element technologies refer to technologies using a machine learning algorithm, such as deep learning, and may be divided into fields of linguistic understanding, visual understanding, reasoning/prediction, knowledge representation, operation control, etc.

AI technology is employed in various fields. For example, linguistic understanding refers to technology for recognizing, applying, and processing verbal/written language of a human and includes natural language processing, machine translation, a conversation system, question and answer, and voice recognition/synthesis. Visual understanding refers to technology for recognizing and processing objects as in human vision and includes object recognition, object tracking, image search, human recognition, scene understanding, space understanding, image improvement, etc. Reasoning/prediction refers to technology for determining information and executing logical reasoning and prediction and includes knowledge/probability-based reasoning, optimization prediction, preference-based planning, recommendation, etc. Knowledge representation refers to technology for automated processing of human experience information into knowledge data and includes knowledge construction (generating/classifying data), knowledge management (utilizing data), etc. Operation control refers to technology for controlling automated driving of a vehicle and motion of a robot and includes motion control (navigation, collision, driving), manipulation control (behavior control), etc.

DESCRIPTION OF EMBODIMENTS

Technical Problem

The disclosure provides a method and device for identifying an object in an image based on feature information that is obtained as a result of combining attribute information of an image, extracted from at least one of a plurality of layers, using at least one feature extraction layer.

Solution to Problem

The disclosure relates to a method, performed by a device, of identifying an object, the method including obtaining an image including an object, extracting at least one piece of attribute information of the image by using a plurality of layers included in a learning network model for determining a category of the object, obtaining feature information representing the object, by combining attribute information extracted from at least some layers among the plurality of layers by using at least one feature extraction layer, and identifying the object based on a result of comparing the obtained feature information with feature information of each of a plurality of previously stored images, wherein a parameter of each of the at least one feature extraction layer is configured according to a training result based on a database including a plurality of images.

BEST MODE

According to an embodiment, a method, performed by a device, of identifying an object includes obtaining an image including an object, extracting at least one piece of attribute information of the image by using a plurality of layers included in a learning network model for determining a category of the object, obtaining feature information representing the object, by combining attribute information extracted from at least some layers among the plurality of layers by using at least one feature extraction layer, and identifying the object based on a result of comparing the obtained feature information with feature information of each of a plurality of previously stored images, wherein a parameter of each of the at least one feature extraction layer is configured according to a training result based on a database including a plurality of images.

According to an embodiment, the database may include a first similarity cluster and a second similarity cluster which are generated as a result of classifying the plurality of images according to similarity.

According to an embodiment, the method may further include extracting a first image and a second image that are included in the first similarity cluster and a third image included in the second similarity cluster and training the feature extraction layer such that a difference between feature information of the first image and feature information of the second image is equal to or less than a first threshold value and a difference between the feature information of the first image and feature information of the third image is equal to or greater than a second threshold value.

According to an embodiment, the obtaining of the feature information may include selecting at least some layers among the plurality of layers by using the at least one feature extraction layer.

According to an embodiment, the obtaining of the feature information may include applying a preset weight value to attribute information extracted from each of the selected at least some layers and combining the weight value-applied attribute information.

According to an embodiment, the obtaining of the feature information may include selecting some of attribute information extracted from the at least some layers and determining the feature information of the object by combining the selected attribute information.

According to an embodiment, the method may further include determining the feature information to be obtained according to a type of a plurality of images included in a database used for training of the feature extraction layer.

According to an embodiment, the identifying may include determining a distance between a feature vector included in the determined feature information and feature information of each of a plurality of images and identifying the object based on the determined distance.

According to an embodiment, a device for identifying an object includes a memory configured to store one or more instructions and a processor configured to execute the one or more instructions stored in the memory, wherein the processor is configured to, by executing the one or more instructions, obtain an image including object, extract at least one piece of attribute information of the image by using a plurality of layers included in a learning network model for determining a category of the object, obtain feature information representing the object, by combining attribute information extracted from at least some layers among the plurality of layers by using at least one feature extraction layer, and identify the object based on a result of comparing the obtained feature information with feature information of each of a plurality of previously stored image objects, in which at least one parameter of the feature extraction layer is configured according to a training result based on a database including a plurality of images.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Although ordinal numbers such as "first", "second", and so forth will be used to describe various components, those components are not limited by the terms. These terms may be used for the purpose of distinguishing one element from another element. For example, a first element may be named as a second element without departing from the right scope of the disclosure, and similarly, a second element may be named as a first element. The term "and/or" includes a combination of a plurality of related items or any one of the plurality of related items.

Throughout the entirety of the specification of the disclosure, if it is assumed that a certain part includes a certain component, the term 'including' means that a corresponding component may further include other components unless a specific meaning opposed to the corresponding component is written. The term used in the specification such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the disclosure. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

Figure 1:
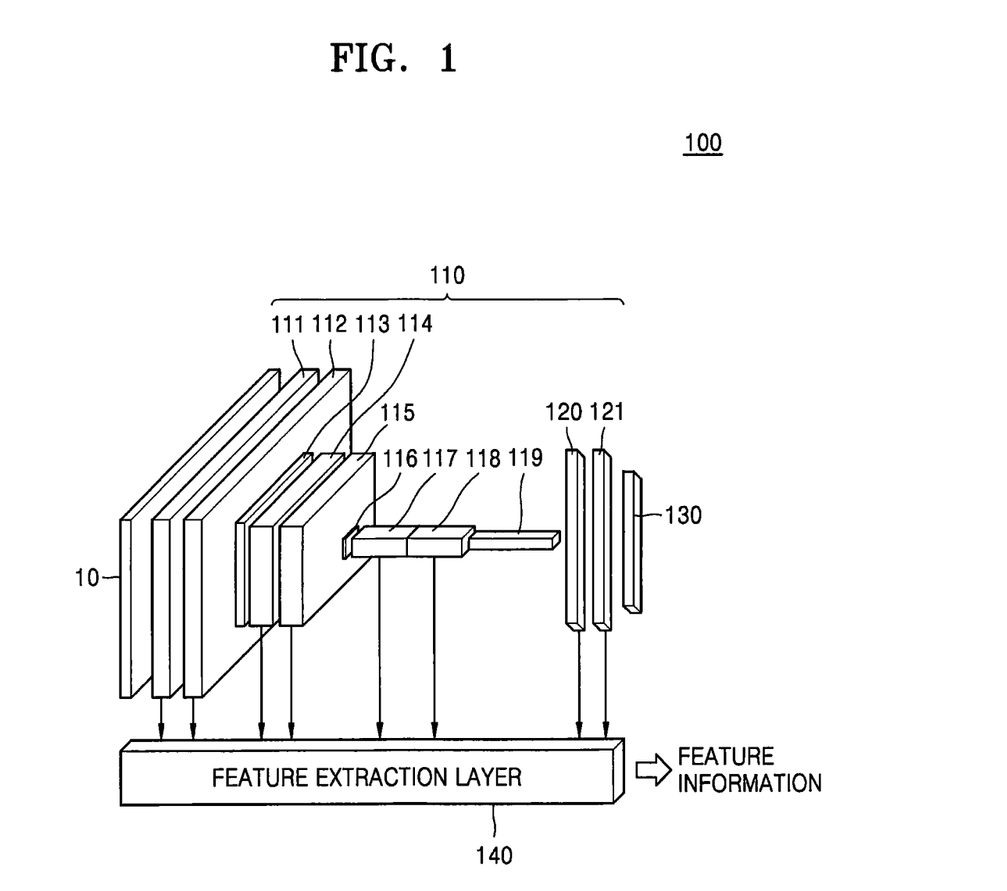
FIG. 1 is a diagram for describing a neural network used by a device to identify an object, according to an embodiment.

FIG. 1 is a diagram for describing a neural network 100 used by a device to identify an object, according to an embodiment.

Referring to FIG. 1, the device may obtain an image 10 including an object. For example, the device may obtain an image including an object by receiving the image including the object from an external device or photographing the object using a photographing device included in the device.

The device according to an embodiment may identify the object included in the image 10 by using the neural network 100. Herein, the neural network 100 may be an algorithm set for extracting various attribute information of an image by using a result of statistical machine learning and identifying and/or determining objects in the image based on the extracted attribute information.

The neural network 100 may be implemented as software or an engine for executing the algorithm set described above. The neural network implemented as software or an engine may be executed by a processor in a device (not shown) or a processor in a server (not shown).

The neural network 100 according to an embodiment may identify objects in the image 10 by abstracting various attributes included in the image 10 input to the neural network 100. In this case, abstraction of the attributes in the image 10 may include detecting attribute information from the image 10 and determining a key attribute capable of representing an object from the detected attribute information.

The neural network 100 may include a species classification network 110 including a plurality of layers 111 through 121 and at least one feature extraction layer 140. Herein, the species classification network 110 may be used to determine a category of an object included in the image 10. Herein, the species classification network 110 may be described as a learning network model.

The device may extract attribute information of an image by using the plurality of layers 111 through 121 included in the species classification network 110. The attribute information of the image may include a color, an edge, a polygon, a saturation, a brightness, a color temperature, blur, sharpness, contrast, etc., but these are merely examples, and the attribute information of the image is not limited thereto. The device may determine a category of the object based on attribute information 130 of the image, finally extracted from the last layer 121 among the plurality of layers 111 through 121.

Meanwhile, the device according to an embodiment may apply attribute information of the image, extracted from at least one of the plurality of layers 111 through 121, as input data of at least one feature extraction layer 140. The device may identify the object based on the feature information of the object, obtained as a result of inputting the attribute information of the image to the at least one feature extraction layer 140. Herein, the feature information may be obtained in the form of a vector capable of indicating a representative attribute of the object.

The device according to an embodiment may improve the accuracy of object identification by using attribute information of not only the last layer 121 but also another layer (e.g., an intermediate-level layer) among the plurality of layers 111 through 121. For example, when the object is a pattern of a thing, using attribute information such as an edge, a polymer, etc., extracted in the intermediate-level layer (e.g., 115) may be more proper than using high-level attribute information extracted mainly in the last layer 121.

The device may be, for example, but not limited to, a smart phone, a tablet personal computer (PC), a smart television (TV), a cellular phone, a personal digital assistant (PDA), a laptop, a media player, a micro server, a global positioning system (GPS) device, an electronic book (e-book) terminal, a digital broadcasting terminal, a navigation system, a kiosk, an MP3 player, a digital camera, a home appliance, and other mobile or non-mobile computing devices. The device may also be a wearable device such as a watch, glasses, a hair band, or a ring, which has a communication function and a data processing function.

Figure 2:
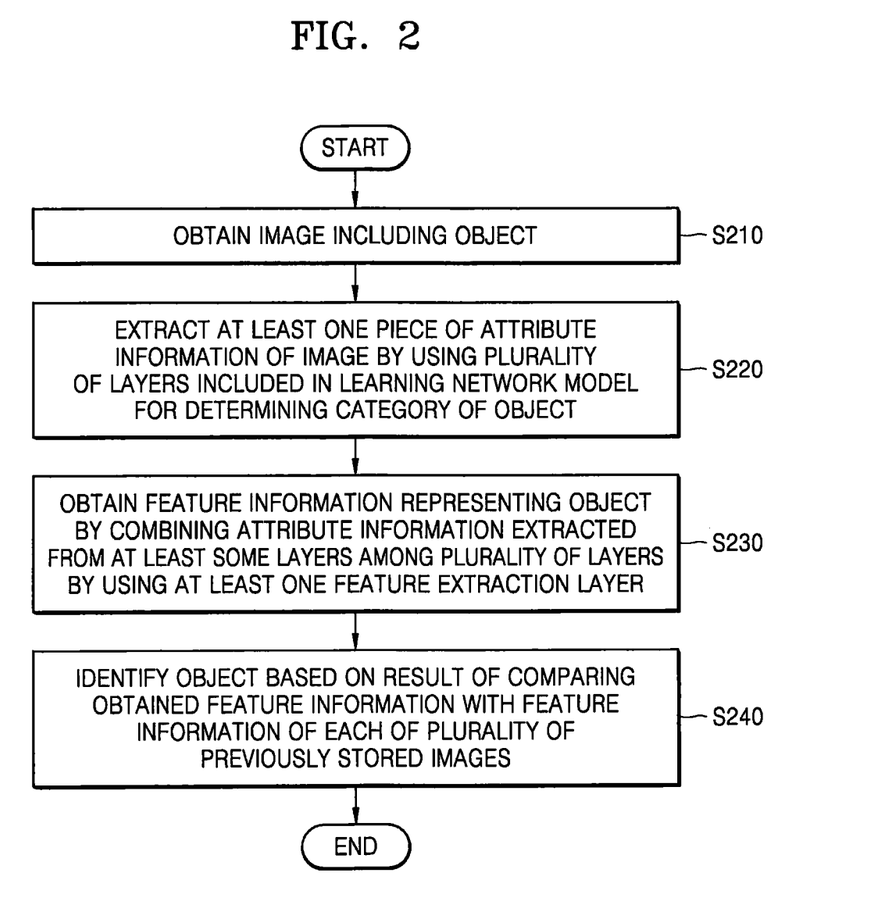
FIG. 2 is a flowchart illustrating a method, performed by a device, of identifying an object according to an embodiment.

FIG. 2 is a flowchart illustrating a method, performed by a device, of identifying an object according to an embodiment.

In operation S210, the device may obtain an image including an object.

In operation S220, the device may extract attribute information of the image by using a plurality of layers included in a learning network model for determining a category of the object.

For example, the device may extract linear information from the image by using a first layer among the plurality of layers. The device may extract a polymer from a second layer connected with the first layer by applying the extracted linear information as input data to the second layer. As described above, the device may extract various attribute information of the image by inputting the image to each of the plurality of layers or applying attribute information extracted from a previous layer as input data.

In operation S230, the device may obtain feature information representing the object by combining attribute information of the object extracted from at least some of the plurality of layers using at least one feature extraction layer.

According to an embodiment, the device may extract the attribute information of the object from a layer other than the last layer on a network for determining the category of the object by using the at least one feature extraction layer. For example, the device may obtain first attribute information of the object, which is extracted from a first layer, second attribute information of the object, which is extracted from a second layer, and third attribute information of the object, which is extracted from a third layer, in a network for determining the category of the object, in which the network includes the first through third layers.

The device may combine at least some of the attribute information of the object, which is extracted from each of the at least some layers by using the at least one feature extraction layer. For example, the device may combine the attribute information of the object by applying the same weight value to the respective layers, or by applying a higher weight value to a layer determined to have a high importance level.

Meanwhile, a criterion used for selecting some of the plurality of layers in the at least one feature extraction layer or combining the attribute information of the object may be determined through learning. For example, the device may train the at least one feature extraction layer to improve the accuracy of object identification as a result of object identification performed prior to operation S210 with respect to each of a plurality of images. This will be described in detail with reference to FIG. 4.

In operation S240, the device may identify the object based on a result of comparing obtained feature information with feature information of each of the plurality of previously stored images.

Herein, the feature information may be a feature vector representing an object included in an image. Each of the plurality of previously stored images may include at least one object.

The device according to an embodiment may compare distances between the obtained feature vector of the object and the feature vectors of the plurality of previously stored images. As a result of the comparison, the device may select an image having the shortest distance to the feature vector of the object included in the obtained image from among the plurality of images and identify the object included in the image that is subject to identification as the object of the selected image.

Meanwhile, according to an embodiment, the device may store a database including feature information of each of a plurality of images in a memory. According to another embodiment, the device may receive the feature information of each of the plurality of images from the database stored in an external device.

Figure 3:
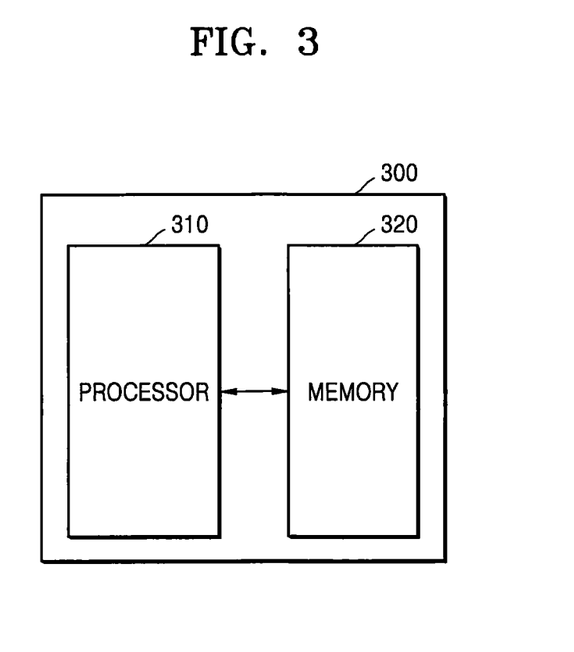
FIG. 3 is a block diagram of a device for identifying an object, according to an embodiment.

FIG. 3 is a block diagram of a device 300 for identifying an object, according to an embodiment.

A processor 310 may include one or more cores (not shown), a graphic processor (not shown), and/or a connection path (e.g., a bus, etc.) for transmitting and receiving signals to and from other components.

According to an embodiment, the processor 310 may in parallel process one or more instructions included in the species classification network 110 and the at least one feature extraction layer 140 in the neural network 100.

For example, the processor 310 may obtain attribute information such as a color, an edge, a polygon, a saturation, a brightness, a color temperature, blur, definition, a contrast ratio, etc., of the image 10 by using the plurality of layers 111 through 121 included in the species classification network 110.

The processor 310 according to an embodiment may select at least some of the plurality of layers 111 through 121 and apply attribute information of the image 10, obtained from the selected layers, as input data of the at least one feature extraction layer 140. The processor 310 may train a criterion for selecting some of the plurality of layers 111 through 121 based on a result of previous object identification using a plurality of images. For example, the processor 310 may train the at least one feature extraction layer 140 to apply as input data, attribute information obtained from the second layer 112, the fourth layer 114, and the fifth layer 115 among the plurality of layers 111 through 121 as the previously obtained result of object identification using the plurality of images.

However, this is merely an example, and a layer from which attribute information is extracted among the plurality of layers 111 through 121 may be previously determined depending on another embodiment.

The processor 310 may learn a weight value for combining extracted attribute information of the at least one feature extraction layer 140 or a criterion for selecting some of the extracted attribute information, based on the previously obtained result of object identification using the plurality of images.

The processor 310 according to an embodiment may obtain feature information representing an object in an image by using the at least one feature extraction layer 140. Herein, the feature information may be obtained in the form of a vector. The processor 310 may identify the object based on the result of comparing the feature information representing the object with feature information of each of a plurality of previously stored images in the database.

For example, the processor 310 may calculate a distance between a feature vector of the object in the obtained image and a feature vector of each of the plurality of images and select an image having the shortest distance among the plurality of images. The processor 310 may identify the object in the obtained image as an object of the selected image.

Meanwhile, the processor 310 may further include a random access memory (RAM, not shown) and a read-only memory (RAM, not shown) that temporarily and/or permanently store a signal (or data) processed in the processor 310. The processor 310 may be implemented in the form of a system on chip (SoC) including at least one of the graphic processor, the RAM, or the ROM.

The memory 320 may store programs (one or more instructions) for processing and controlling the processor 310. The programs stored in the memory 320 may be classified into a plurality of modules according to functions thereof. According to an embodiment, the memory 320 may include a data learner and a data recognizer. The data learner and the data recognizer may independently include neural network modules, respectively, or may share one neural network module.

The neural network module may include a plurality of layers included in a species classification network and at least one feature extraction layer. The plurality of layers included in the species classification network may one or more instructions that detect at least one piece of attribute information from each image and abstract the detected at least one piece of attribute information. For example, the first through $N^{th}$ layers 111 through 121 may include a convolutional layer including one or more instructions that extract attribute information of each image from the image and/or a pooling layer including one or more instructions that determine a representative value from an extracted image attribute.

The at least one feature extraction layer 140 may include a convolutional layer including one or more instructions that extract feature information representing an object in an image based on at least one piece of attribute information obtained from the species classification network 110 and/or a pooling layer including one or more instructions that determine a representative value from an extracted image attribute.

An architecture of the at least one feature extraction layer 140 according to an embodiment will be described in detail with reference to FIGS. 6 through 8.

Figure 4:
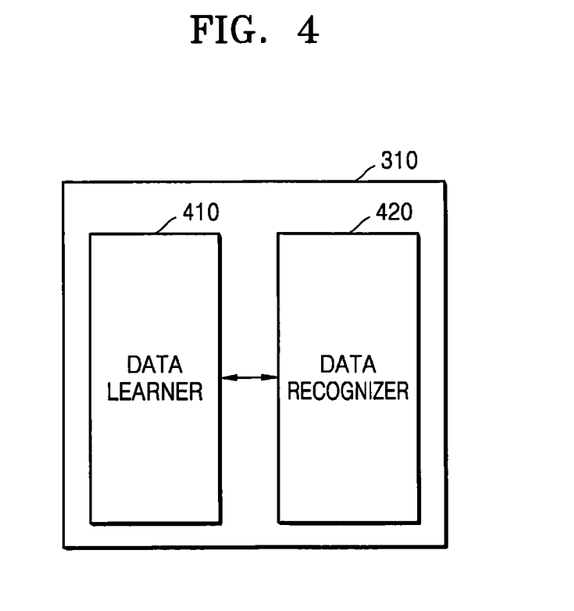
FIG. 4 is a diagram for describing a processor according to an embodiment.

FIG. 4 is a diagram for describing the processor 330 according to an embodiment.

Referring to FIG. 4, the processor 330 according to an embodiment may include a data learner 410 and a data recognizer 420.

The data learner 410 may learn a criterion for identifying an object included in an image. For example, the data learner 410 may learn a parameter of the at least one feature extraction layer 140 to determine feature information representing an object from attribute information of an image used for identifying the object.

The data recognizer 420 may identify the object in the image, based on a criterion learned through the data learner 410. For example, the data recognizer 420 may identify the object included in the image by applying, as input data, attribute information of an image extracted from the species classification network 110 to the learned feature extraction layer 140.

At least one of the data learner 410 or the data recognizer 420 may be manufactured in the form of at least one hardware chip and mounted on the device. For example, at least one of the data learner 410 or the data recognizer 420 may be manufactured in the form of a dedicated hardware chip for artificial intelligence (AI), or may be manufactured as a part of an existing general-purpose processor (e.g., a central processing unit (CPU), or an application processor) or a dedicated graphic processor (e.g., a graphic processing unit (GPU)) and mounted on various electronic devices.

In this case, the data learner 410 and the data recognizer 420 may be mounted on one device or on separate devices. For example, one of the data learner 410 and the data recognizer 420 may be included in one device, and the other may be included in a server. The data learner 410 and the data recognizer 420 may be connected in a wired or wireless manner, such that model information established by the data learner 410 may be provided to the data recognizer 420 or data input to the data recognizer 420 may be provided to the data learner 410 as additional training data.

Meanwhile, at least one of the data learner 410 or the data recognizer 420 may be implemented with a software module. When at least one of the data learner 410 and the data recognizer 420 may be implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 5:
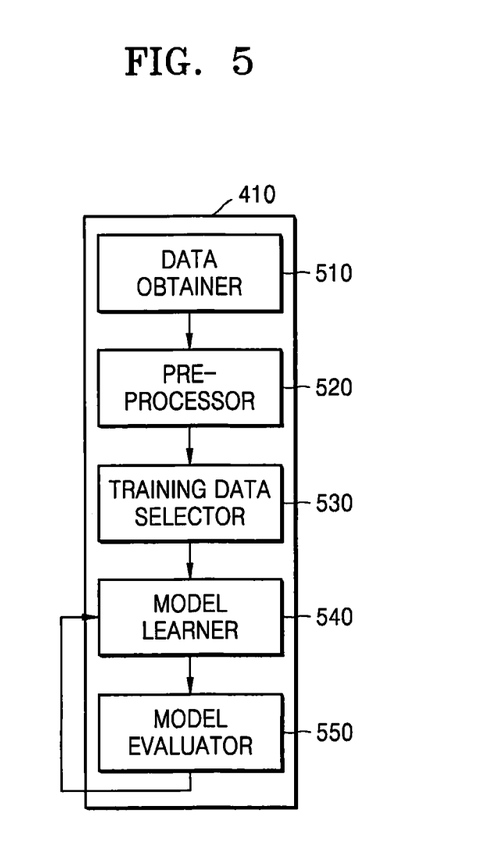
FIG. 5 is a block diagram of a data learner according to an embodiment.

FIG. 5 is a block diagram of the data learner 410 according to an embodiment.

Referring to FIG. 5, the data learner 410 according to some embodiments may include a data obtainer 510, a pre-processor 520, a training data selector 530, a model learner 540, and a model evaluator 550. However, this is merely an example, and the data learner 410 may include less components than the above-described components, or other components in addition to the above-described components may be further included in the data learner 410.

The data obtainer 510 may obtain at least one of an image or a video. Herein, the video may include a plurality of images. For example, the data obtainer 510 may obtain an image from a device including the data learner 410 or an external device capable of communicating with the device including the data learner 410.

Meanwhile, the image obtained by the data obtainer 510 according to an embodiment may be any one of a plurality of images classified based on similarity. For example, the data obtainer 510 may obtain for learning, an image included in at least one similarity cluster classified based on similarity.

The pre-processor 520 may pre-process the obtained data, such that the obtained data may be used in learning for identifying an object. The pre-processor 520 may process the obtained data into a preset format, such that the model learner 540 may use the obtained data in learning for identifying an object. For example, the pre-processor 520 may divide an input image into a plurality of images, from each of which an attribute R, an attribute G, and an attribute B may be detected.

The training data selector 530 may select an image needed for learning from pre-processed data. The selected image may be provided to the model learner 540. The training data selector 530 may select an image needed for learning from pre-processed data, according to a preset criterion. For example, the training data selector 530 may select a first image and a second image that are included in a first similarity cluster and a third image included in a second similarity cluster.

The model learner 540 may learn a criterion regarding how to detect feature information of the object in the image from at least one piece of attribute information of the image in the at least one feature extraction layer 140. For example, the model learner 540 may learn a first criterion regarding a layer among a plurality of layers included in the species classification network 110, from which attribute information is extracted for identification of the object. Herein, the first criterion may include a type, a number, or a level of image attributes used for the device to identify the object in the image from the image by using a neural network.

According to various embodiments, in a case where there are a plurality of neural network models established in advance, the model learner 540 may determine a neural network model having a high correlation between input training data and basic training data as a neural network model to be learned. In this case, the basic training data may be classified in advance according to a data type, and the neural network model may be established in advance for each data type. For example, the basic training data may be classified depending on various criteria such as a region where training data is generated, a time in which training data is generated, a size of training data, a genre of training data, a generator of training data, a type of an object in training data, and so forth.

Meanwhile, the feature information of the object may be determined according to a data recognition model used in the model learner 540. For example, when plural image data included in the first similarity cluster is applied as training data and plural image data included in the second similarity cluster is applied as training data, different feature information may be calculated upon application of the same image.

The model learner 540 may learn the neural network model using reinforcement learning based on a feedback regarding whether a prediction result of the person's emotion based on learning is correct or not.

Once the model learner 540 learns the neural network model, the model learner 540 may store a learned data recognition model. In this case, the model learner 540 may store the learned recognition model in the memory of the device including the data recognizer 420. Alternatively, the model learner 540 may store the learned data recognition model in the memory of the device including the data recognizer 420 to be described later. Alternatively, the model learner 540 stores the learned data recognition model in a memory of a server connected with the device via a wired or wireless network.

In this case, the memory in which the learned data recognition model is stored may also store an instruction or data related to at least one other element of the device. The memory may also store software and/or programs. The program may include a kernel, middleware, an application programming interface (API), and/or an application program (or "application"), and the like.

In a case where a recognition result output after input of evaluation data to the data recognition model fails to satisfy a criterion, the model evaluator 550 may cause the model learner 540 to learn again. In this case, the evaluation data may be preset data for evaluating the data recognition model. Herein, the evaluation data may include a matching rate, etc., between an object identified based on the data recognition model and a real object.

Meanwhile, if there are a plurality of learned data recognition models, the model evaluator 550 evaluates whether each learned data recognition model satisfies the predetermined criterion, and determines a learned data recognition model satisfying the predetermined criterion as a final data recognition model.

At least one of the data obtainer 510, the pre-processor 520, the training data selector 530, the model learner 540, or the model evaluator 550 in the data learner 410 may be manufactured in the form of at least one hardware chip and mounted on the device. For example, at least one of the data obtainer 510, the pre-processor 520, the training data selector 530, the model learner 540, and the model evaluator 550 may be manufactured in the form of a dedicated hardware chip for AI, or may be manufactured as a part of an existing general-purpose processor (e.g., a CPU or an application processor) or a dedicated graphic processor (e.g., a GPU) and mounted on various devices.

The data obtainer 510, the pre-processor 520, the training data selector 530, the model learner 540, and the model evaluator 550 may be mounted on one device or on separate devices, respectively. For example, some of the data obtainer 510, the pre-processor 520, the training data selector 530, the model learner 540, and the model evaluator 550 may be included in the device, and some others thereof may be included in a server.

At least one of the data obtainer 510, the pre-processor 520, the training data selector 530, the model learner 540, or the model evaluator 550 may be implemented with a software module. When at least one of the data obtainer 510, the pre-processor 520, the training data selector 530, the model learner 540, and the model evaluator 550 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 6:
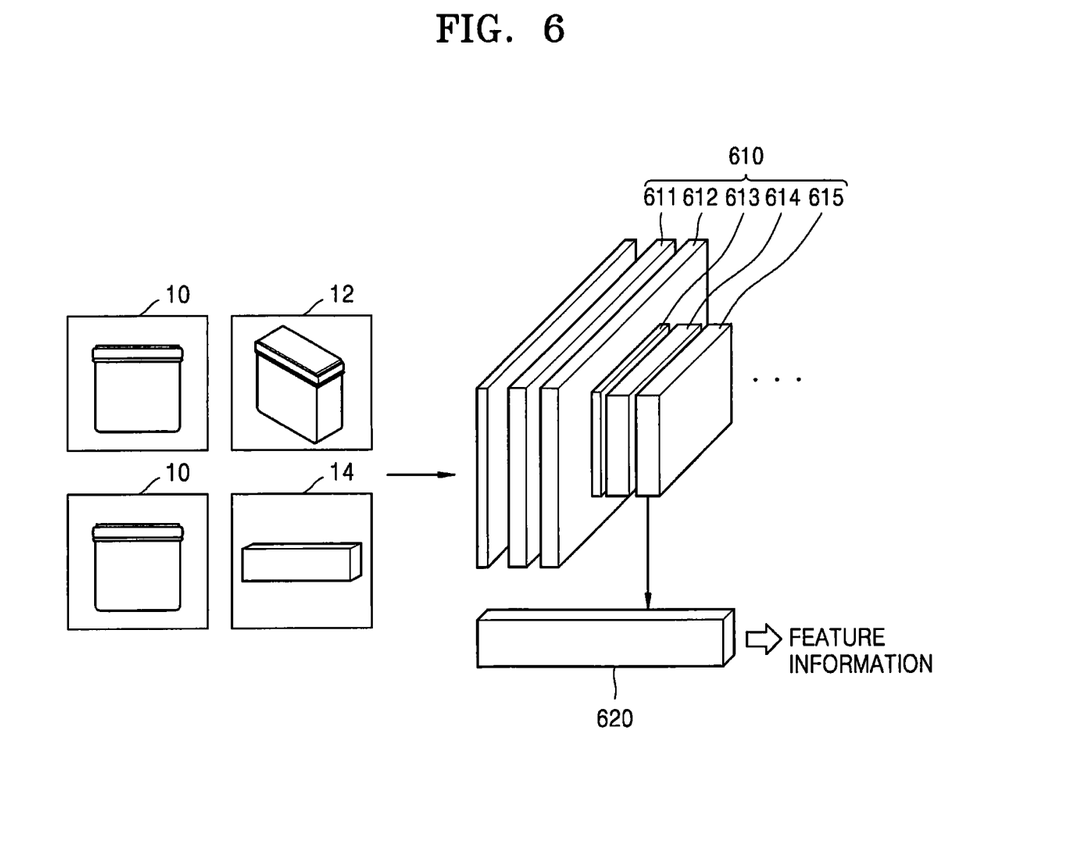
FIG. 6 is a diagram for describing a method, performed by a device, of training a neural network to identify an object in an image, according to an embodiment.

FIG. 6 is a diagram for describing a method, performed by a device, of training a neural network 600 to identify an object in the image 10, according to an embodiment.

Referring to FIG. 6, the neural network 600 may include a species classification network 610 including first through fifth layers 611 through 615 used to extract at least one piece of attribute information from an image and at least one feature extraction layer 620 used to obtain feature information representing an object from at least one piece of attribute information.

Herein, the first through fifth layers 611 through 615 may include a convolutional layer including one or more instructions that extract attribute information of each image from the image and/or a pooling layer including one or more instructions that determine a representative value from an extracted image attribute. Meanwhile, in the current embodiment, in the species classification network 610, as it is learned that attribute information or a specifies classification result after the fifth layer 615 is not used for object identification, other layers (not shown) existing after the fifth layer 615 will not be described.

The device may train the at least one feature extraction layer 620 by applying images included in at least one similarity cluster in a database as input data to the neural network 600.

For example, the device may obtain feature information of an object in an image by selecting at random and combining attribute information of the image, extracted from each of the first through fifth layers 611 through 615. The device may repeatedly train the at least one feature extraction layer 620 until the obtained feature information of the object satisfies a preset accuracy. For example, the device may select a first image 10 and a second image 12 that are included in the first similarity cluster and a third image 14 included in the second similarity cluster. The device may train the at least one feature extraction layer 620 such that a difference between feature information of the first image 10 and feature information of the second image 12 is equal to or less than a first threshold value and a difference between the feature information of the first image 10 and feature information of the third image 14 is equal to or greater than a second threshold value. Thus, for example, the at least one feature extraction layer 620 may learn a criterion indicating that combining attribute information extracted from the fifth layer 615 of the species classification network 610 is most proper to determine the feature information of the object.

Thus, the device may identify the object in the image that is subject to identification, by using the feature extraction layer 620 trained to combine the attribute information extracted from the fifth layer 615.

Although it is described with reference to FIG. 6 that the species classification network 610 includes five layers, the disclosure is not limited thereto. For example, the species classification network 610 may include layers that are more than or less than those illustrated in FIG. 6.

According to another embodiment, the device may not perform an additional operation such as extraction of attribute information with respect to layers after a third layer 613 in the species classification network 610, when the feature extraction layer learns a criterion indicating that it is most proper to determine the feature information based on the attribute information of the third layer 613 among the first through fifth layers 611 through 615.

Figure 7:
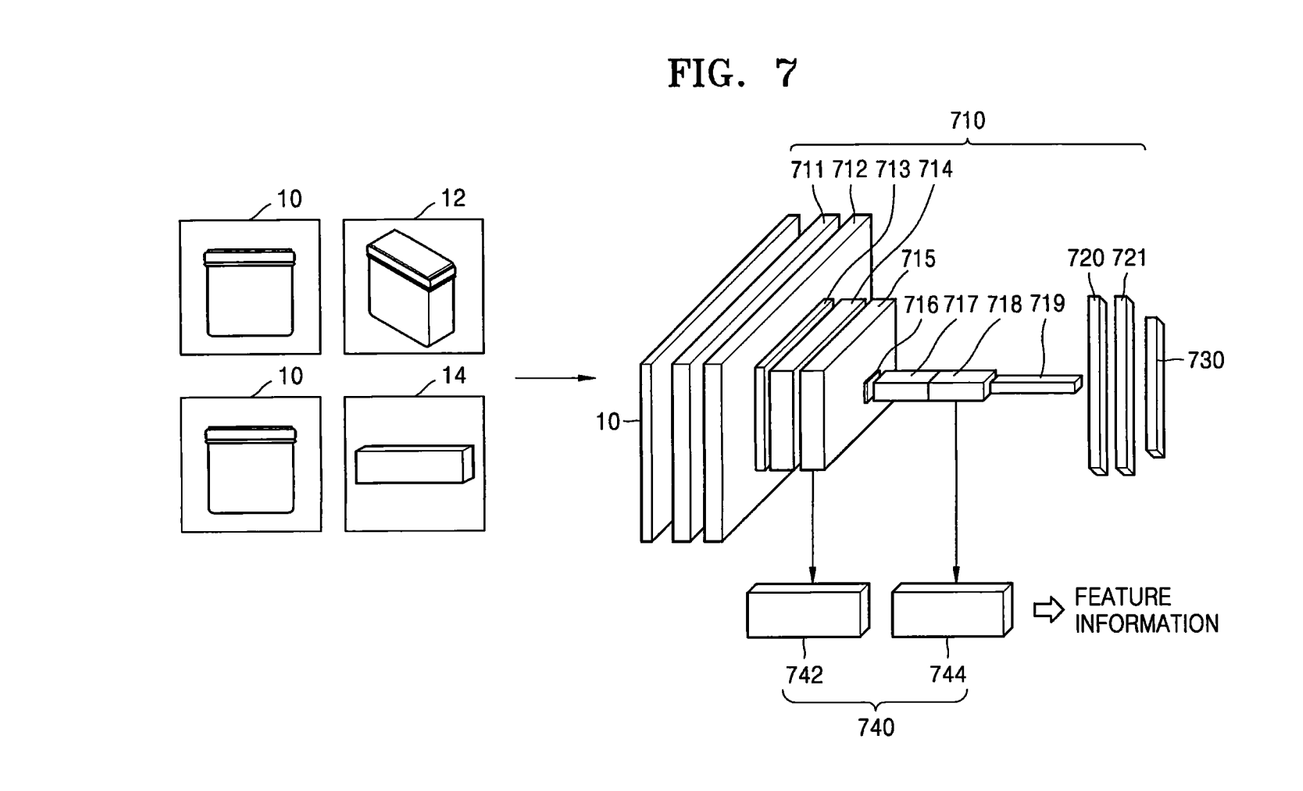
FIG. 7 is a diagram for describing a method, performed by a device, of training a neural network to identify an object in an image, according to another embodiment.

FIG. 7 is a diagram for describing a method, performed by a device, of training a neural network 700 to identify an object in the image 10, according to another embodiment.

Referring to FIG. 7, the neural network 700 may include a species classification network 710 including first through $N^{th}$ layers 711 through 721 used to extract at least one piece of attribute information from an image and at least one of feature extraction layers 742 and 744 used to obtain feature information representing an object from at least one piece of attribute information. Herein, the first through $N^{th}$ layers 711 through 721 may include a convolutional layer including one or more instructions that extract attribute information of each image from the image and/or a pooling layer including one or more instructions that determine a representative value an extracted image attribute. In addition, a species classification result 730 with respect to the object in the image may be calculated through the species classification network 710. However, this is merely an example, such that when the species classification result 730 is not needed for object identification, it may not be calculated.

The device may train the at least one of feature extraction layers 742 and 744 by applying images included in at least one similarity cluster in a database as input data to the neural network 700. A method, performed by the device, of training the at least one of feature extraction layers 742 and 744 may be the same as described above with reference to FIG. 6.

Thus, for example, the at least one of feature extraction layers 742 and 744 may learn a criterion indicating that combining attribute information extracted from a fifth layer 715 of the species classification network 710 with attribute information extracted from a ninth layer 719 is most proper to determine the feature information of the object.

Thus, the device may identify the object in the image that is subject to recognition, by using the plurality of feature extraction layers 742 and 744 trained to combine the attribute information extracted from the fifth layer 715 with the attribute information extracted from the ninth layer 719. Meanwhile, in FIG. 7, the device may merge first feature information determined in the first feature extraction layer 742 based on the attribute information extracted from the fifth layer 715 with second feature information determined in the second feature extraction layer 744 based on the attribute information extracted from the ninth layer 719, and determine a merging result as the feature information of the object.

However, this is merely an example, and features such as an architecture, a number, etc., of the feature extraction layers 742 and 744 are not limited to the above-described example.

Figure 8:
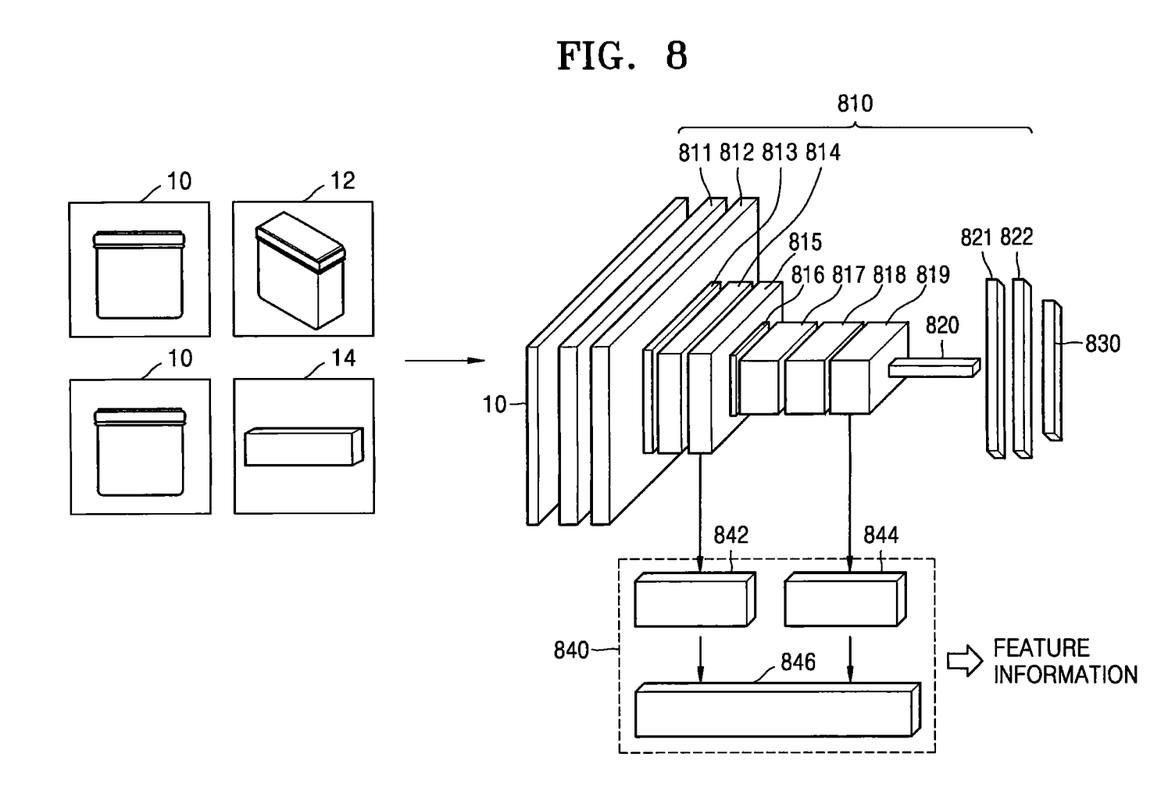
FIG. 8 is a diagram for describing a method, performed by a device, of training a neural network to identify an object in an image, according to another embodiment.

FIG. 8 is a diagram for describing a method, performed by a device, of training a neural network 800 to identify an object in the image 10, according to another embodiment.

Referring to FIG. 8, the neural network 800 may include a species classification network 810 including first through $N^{th}$ layers 811 through 822 used to extract at least one piece of attribute information from an image and at least one feature extraction layer 840 used to obtain feature information representing an object from at least one piece of attribute information. Herein, the first through $N^{th}$ layers 811 through 822 may include a convolutional layer including one or more instructions that extract attribute information of each image from the image and/or a pooling layer including one or more instructions that determine a representative value from an extracted image attribute.

In addition, a species classification result 830 with respect to the object in the image may be calculated through the species classification network 810. However, this is merely an example, such that when the species classification result 830 is not needed for object identification, it may not be calculated.

The device may train the at least one feature extraction layer 840 by applying images included in at least one similarity cluster in a database as input data to the neural network 800. A method, performed by the device, of training the at least one feature extraction layer 840 may be the same as described above with reference to FIG. 6. Thus, for example, the at least one feature extraction layer 840 may learn a criterion indicating that combining attribute information extracted from a fifth layer 815 of the species classification network 810 with attribute information extracted from a ninth layer 819 is most proper to determine the feature information of the object. The device may also learn a method of combining attribute information.

For example, the device may apply as input data of a third feature extraction layer 846, first feature information determined in the first feature extraction layer 842 based on the attribute information extracted from the fifth layer 815 and second feature information determined in the second feature extraction layer 844 based on the attribute information extracted from the ninth layer 819, and determine a merging result as the feature information of the object. Thus, the device may obtain the feature information of the object by using the third feature extraction layer 846. Herein, the first feature extraction layer 842 and the second feature extraction layer 844 may process attribute information extracted from the species classification network 810 by pooling or averaging the attribute information and may use the processed attribute information to provide the same to the third feature extraction layer 846.

However, this is merely an example, and features such as an architecture, a number, etc., of the feature extraction layer 840 are not limited to the above-described example.

Figure 9:
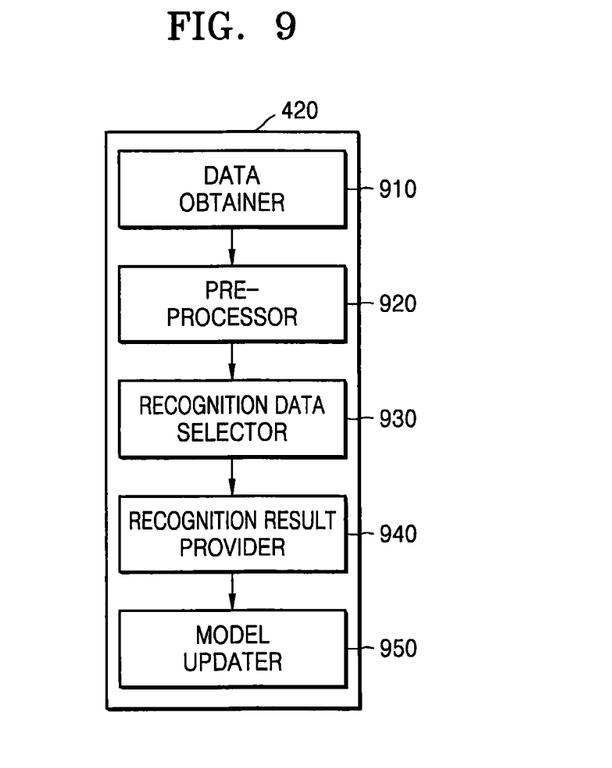
FIG. 9 is a block diagram of a data recognizer according to an embodiment.

FIG. 9 is a block diagram of the data recognizer 420 according to an embodiment.

Referring to FIG. 9, the data recognizer 420 according to some embodiments may include a data obtainer 910, a pre-processor 920, a recognition data selector 930, a recognition result provider 940, and a model updater 950.

The data obtainer 910 may obtain an image needed for object identification, and the pre-processor 920 may pre-process the obtained image such that the image obtained for object identification may be used. The pre-processor 920 may process the obtained image into a preset format, such that a recognition result provider 940 to be described later may use the obtained image to identify the object. The recognition data selector 930 may select an image needed for object identification from pre-processed data. The selected data may be provided to the recognition result provider 940.

The recognition result provider 940 may apply the selected image to the neural network according to an embodiment to identify the object in the image. Herein, the neural network may include a species classification network and at least one feature extraction layer as described above. The method of identifying the object in the image by applying the image to the neural network may correspond to the method described above with reference to FIGS. 1 through 8.

The recognition result provider 940 may provide identification information of at least one object included in the image.

The model updater 950 may provide information about evaluation to the model learner 540 described with reference to FIG. 5 to update a species classification network included in the neural network or a parameter of at least one feature extraction layer based on evaluation with respect to an object identification result provided by the recognition result provider 940.

At least one of the data obtainer 910, the pre-processor 920, the recognition data selector 930, the recognition result provider 940, or the model updater 950 in the data recognizer 420 may be manufactured in the form of at least one hardware chip and mounted on the device. For example, at least one of the data obtainer 910, the pre-processor 920, the recognition data selector 930, the recognition result provider 940, or the model updater 950 may be manufactured in the form of a dedicated hardware chip for AI, or may be manufactured as a part of an existing general-purpose processor (e.g., a CPU or an application processor) or a dedicated graphic processor (e.g., a GPU) and mounted on various devices.

The data obtainer 910, the pre-processor 920, the recognition data selector 930, the recognition result provider 940, and the model updater 950 may be mounted on one device or on separate devices, respectively. For example, some of the data obtainer 910, the pre-processor 920, the recognition data selector 930, the recognition result provider 940, and the model updater 950 may be included in the device, and some others thereof may be included in a server.

At least one of the data obtainer 910, the pre-processor 920, the recognition data selector 930, the recognition result provider 940, or the model updater 950 may be implemented as a software module. When at least one of the data obtainer 910, the pre-processor 920, the recognition data selector 930, the recognition result provider 940, or the model updater 950 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 10:
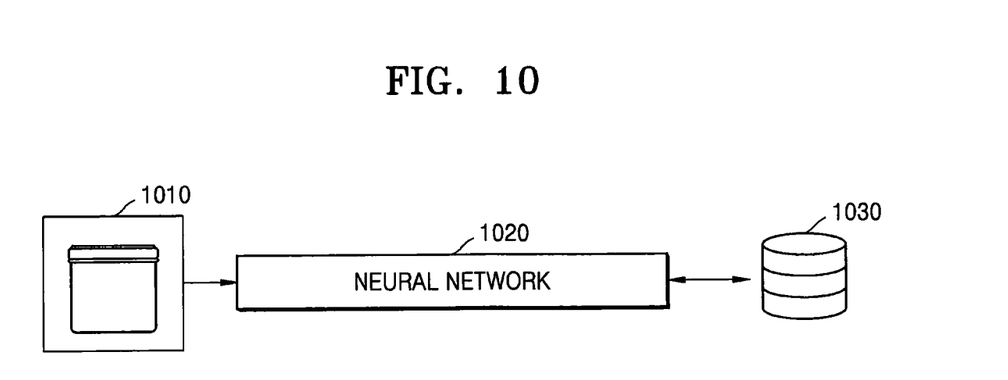
FIG. 10 is a diagram for describing a method, performed by a device, of identifying an object by comparing feature information of a plurality of images stored in a database with feature information of an object in an image, according to an embodiment.

FIG. 10 is a diagram for describing a method, performed by a device, of identifying an object by comparing feature information of a plurality of images stored in a database with feature information of an object in an image, according to an embodiment.

Referring to FIG. 10, the device may apply an image 1010 as input data of a neural network 1020 for object identification. Herein, the neural network 1020 may include a species classification network and at least one feature extraction layer as described above. Meanwhile, a method, performed by the device, of extracting feature information of an object by using the neural network 1020 may correspond to the method described above with reference to FIGS. 1 through 9.

The device may obtain feature information representing an object in the image 1010 as a result of applying the image 1010 as input data to the neural network 1020. The feature information may have a form of a vector. Meanwhile, in the current embodiment, for convenience of description, the feature information will be referred to as a feature vector.

The device may compare the feature vector representing the object in the image 1010 with a feature vector of each of a plurality of images previously stored in a database 1030. For example, the device may calculate distances between the feature vector of the object and the feature vectors of the plurality of images. The device may select an image having the shortest calculated distance from among the plurality of images. The device may identify the object in the image that is subject to identification as an object in the selected image.

Meanwhile, the database 1030 that previously stores the feature information of each of the plurality of images may be stored in the device or in an external device. When the database 1030 is stored in the external device, the device may request identification of the object from the external device by transmitting the feature vector of the obtained object to the external device. In another example, the device may request the external device to provide the feature information of each of the plurality of images.

The methods according to the exemplary embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

Reference numerals have been used in exemplary embodiments illustrated in the attached drawings, and particular terms have been used to describe the embodiments, but the embodiments are not limited to the particular terms, and the disclosure may include any element that may be generally conceived by those of ordinary skill in the art.

The embodiment may be represented by block components and various process operations. Such functional blocks may be implemented by various numbers of hardware and/or software components which perform specific functions. For example, the disclosure may employ various integrated circuit components, e.g., memory elements, processing elements, logic elements, look-up tables, and the like, which may carry out a variety of functions under the control of one or more microprocessors or other control devices. The embodiment may employ the same type or different types of cores or different types of CPUs. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the embodiment may employ any number of conventional techniques for electronics configuration, signal processing and/or control, data processing and the like. The term "mechanism", "element", "means", or "component" is used broadly and is not limited to mechanical or physical components. The term may include a series of routines of software in conjunction with the processor or the like.

The particular implementations shown and described in an embodiment are illustrative examples of the disclosure and are not intended to otherwise limit the scope of the disclosure in any way. For the sake of brevity, electronics according to the related art, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the disclosure unless the element is specifically described as "essential" or "critical".

Herein (especially, in the claims), the use of "the" and other demonstratives similar thereto may correspond to both a singular form and a plural form. Also, when a range is described in an embodiment, the range has to be regarded as including inventions adopting any individual element within the range (unless described otherwise), and it has to be regarded as having written in the detailed description each individual element included in the range. Unless the order of operations of a method according to an embodiment is explicitly mentioned or described otherwise, the operations may be performed in a proper order. The embodiments are not limited to the order the operations are mentioned. The use of all examples or exemplary terms (e.g., "etc.,", "and (or) the like", and "and so forth") in an embodiment is merely intended to describe the embodiment in detail, and the scope of the embodiment is not necessarily limited by the examples or exemplary terms unless defined by the claims. Also, one of ordinary skill in the art may appreciate that the disclosure may be configured through various modifications, combinations, and changes according to design conditions and factors without departing from the spirit and technical scope of the disclosure and its equivalents.

The invention claimed is:

1. A method, performed by a device, of identifying an object, the method comprising:
   obtaining an image comprising an object;
   obtaining a first type of attribute information of the image by using a first layer of a plurality of layers included in a learning network model for determining a category of the object;
   obtaining a second type of attribute information of the image by using a second layer of the plurality of layers included in the learning network model for determining the category of the object, wherein the first type of attribute information is a different type of attribute information than the second type of attribute information;
   obtaining feature information representing the object by combining the first type of attribute information obtained from the first layer with the second type of attribute information obtained from the second layer by using at least one feature extraction layer; and
   identifying the object based on a result of comparing the obtained feature information with feature information of each of a plurality of previously stored images,
   wherein the first layer and the second layer are selected, from among the plurality of layers, according to a training result based on a database comprising a plurality of images.

2. The method of claim 1, wherein the database comprises a first similarity cluster and a second similarity cluster which are generated as a result of classifying the plurality of images according to similarity.

3. The method of claim 2, further comprising:
obtaining a first image and a second image that are included in the first similarity cluster and a third image included in the second similarity cluster; and
training the at least one feature extraction layer such that a difference between feature information of the first image and feature information of the second image is equal to or less than a first threshold value and a difference between the feature information of the first image and feature information of the third image is equal to or greater than a second threshold value.

4. The method of claim 1, wherein obtaining the feature information comprises selecting at least some layers among the plurality of layers by using the at least one feature extraction layer.

5. The method of claim 4, wherein obtaining the feature information comprises applying a preset weight value to attribute information obtained from each of the selected at least some layers and combining the weight value-applied attribute information.

6. The method of claim 1, wherein obtaining the feature information comprises:
selecting some of the attribute information obtained from at least some layers; and
determining the feature information of the object by combining the selected attribute information.

7. The method of claim 1, further comprising determining the feature information to be obtained according to a type of a plurality of images included in a database used for training of the feature extraction layer.

8. A device for identifying an object, the device comprising:
a memory configured to store one or more instructions; and
a processor configured to execute the one or more instructions stored in the memory,
wherein the processor is configured to, by executing the one or more instructions,
obtain an image comprising object;
obtain a first type of attribute information of the image by using a first layer of a plurality of layers included in a learning network model for determining a category of the object;
obtain a second type of attribute information of the image by using a second layer of the plurality of layers included in the learning network model for determining the category of the object, wherein the first type of attribute information is a different type of attribute information than the second type of attribute information;
obtain feature information representing the object, by combining the first type of attribute information obtained from the first layer with the second type of attribute information obtained from the second layer by using at least one feature extraction layer; and
identify the object based on a result of comparing the obtained feature information with feature information of each of a plurality of previously stored image objects,
wherein the first layer and the second layer are selected, from among the plurality of layers, according to a training result based on a database comprising a plurality of images.

9. The device of claim 8, wherein the database comprises a first similarity cluster and a second similarity cluster which are generated as a result of classifying the plurality of images according to similarity.

10. The device of claim 9, wherein the processor is further configured to, by executing the one or more instructions:
obtain a first image and a second image that are included in the first similarity cluster and a third image included in the second similarity cluster; and
train the at least one feature extraction layer such that a difference between feature information of the first image and feature information of the second image is equal to or less than a first threshold value and a difference between the feature information of the first image and feature information of the third image is equal to or greater than a second threshold value.

11. The device of claim 8, wherein the processor is further configured to, by executing the one or more instructions, select at least some layers among the plurality of layers by using the at least one feature extraction layer.

12. The device of claim 11, wherein the processor is further configured to, by executing the one or more instructions, apply a preset weight value to attribute information obtained from each of the selected at least some layers and combine the weight value-applied attribute information.

13. The device of claim 8, wherein the processor is further configured to, by executing the one or more instructions:
select some of the attribute information of the object obtained from at least some layers; and
determine the feature information of the object by combining the selected attribute information.

14. The device of claim 8, wherein the feature information to be obtained is determined according to a type of a plurality of images included in a database used for training of the feature extraction layer.

15. A non-transitory computer-readable recording medium having recorded thereon a program, wherein the program, when executed, causes a computer to:
obtain an image comprising an object;
obtain a first type of attribute information of the image by using a first layer of a plurality of layers included in a learning network model for determining a category of the object;
obtain a second type of attribute information of the image by using a second layer of the plurality of layers included in the learning network model for determining the category of the object, wherein the first type of attribute information is a different type of attribute information than the second type of attribute information;
obtain feature information representing the object by combining the first type of attribute information obtained from the first layer with the second type of attribute information obtained from the second layer by using at least one feature extraction layer; and
identify the object based on a result of comparing the obtained feature information with feature information of each of a plurality of previously stored images,
wherein the first layer and the second layer are selected, from among the plurality of layers, according to a training result based on a database comprising a plurality of images.

16. The non-transitory computer-readable recording medium of claim 15, wherein the database comprises a first similarity cluster and a second similarity cluster which are generated as a result of classifying the plurality of images according to similarity.

17. The non-transitory computer-readable recording medium of claim 16, wherein the program, when executed, further causes the computer to:
- obtain a first image and a second image that are included in the first similarity cluster and a third image included in the second similarity cluster; and
- train the at least one feature extraction layer such that a difference between feature information of the first image and feature information of the second image is equal to or less than a first threshold value and a difference between the feature information of the first image and feature information of the third image is equal to or greater than a second threshold value.

18. The non-transitory computer-readable recording medium of claim 15, wherein obtaining the feature information comprises selecting at least some layers among the plurality of layers by using the at least one feature extraction layer.

19. The non-transitory computer-readable recording medium of claim 18, wherein obtaining the feature information comprises applying a preset weight value to attribute information obtained from each of the selected at least some layers and combining the weight value-applied attribute information.

20. The non-transitory computer-readable recording medium of claim 15, wherein obtaining the feature information comprises:
- selecting some of the attribute information obtained from at least some layers; and
- determining the feature information of the object by combining the selected attribute information.

* * * * *